Figure 4:
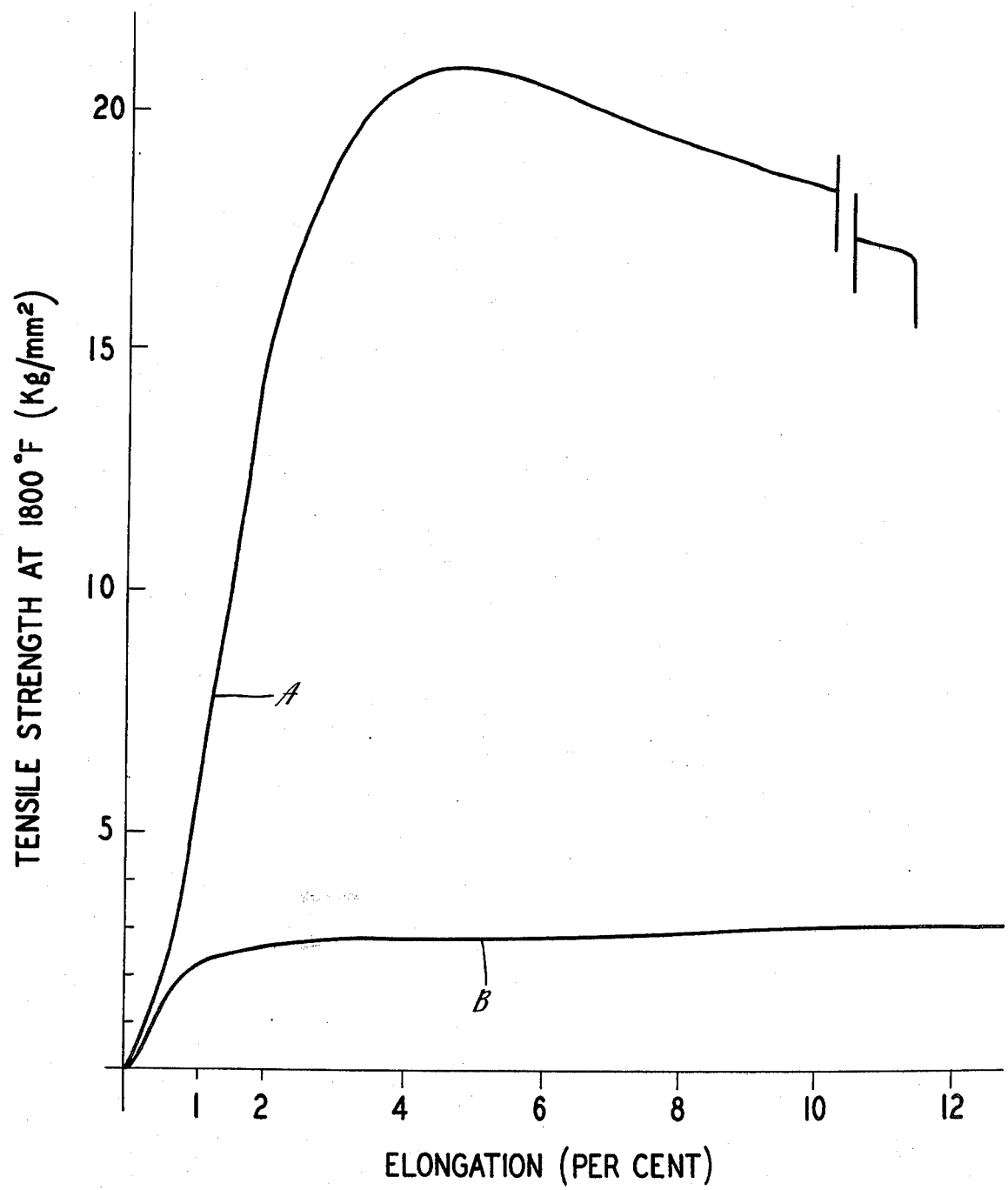

United States Patent [19]

Berghezan

[11] 3,919,764
[45] Nov. 18, 1975

[54] METHOD OF MAKING METALLIC COMPOSITE MATERIALS

[75] Inventor: Aurel I. Berghezan, Rhode-St.-Genese, Belgium

[73] Assignee: Union Carbide Corporation, New York, N.Y.

[22] Filed: Nov. 15, 1971

[21] Appl. No.: 199,041

Related U.S. Application Data

[63] Continuation of Ser. No. 831,170, June 6, 1969, abandoned.

[52] U.S. Cl. .................. 228/185; 29/419; 228/193; 228/234
[51] Int. Cl.² ......................................... B23K 35/16
[58] Field of Search .......... 29/472.3, 475, 480, 482, 29/497.5

[56] References Cited
UNITED STATES PATENTS

| | | | |
|---|---|---|---|
| 3,057,481 | 10/1962 | Pall .................................. | 29/480 X |
| 3,061,912 | 11/1962 | Kalil .................................. | 29/480 X |
| 3,078,563 | 2/1963 | Gould et al. .................... | 29/497.5 X |
| 3,371,407 | 3/1968 | Forsyth et al. ................... | 29/475 X |
| 3,419,952 | 1/1969 | Carlson ............................ | 29/482 X |
| 3,436,816 | 4/1969 | Lemelson ........................ | 29/472.3 X |
| 3,443,301 | 5/1969 | Basche et al. ................... | 29/475 X |

Primary Examiner—Francis S. Husar
Assistant Examiner—Gus T. Hampilos
Attorney, Agent, or Firm—W. R. Moran

[57] ABSTRACT

Reinforcing fibers are precisely aligned and distributed in a metal matrix by (a) forming a corrugated sheet of the metal, filling the valleys with reinforcing fibers, sandwiching the sheet between two flat sheets of the same metal and subjecting the assembly to pressure and elevated temperatures until the layers of metal matrix become integrally bonded, or (b) placing between two sheets of metal matrix in an alternate or periodic but parallel fashion fibers or rods of both the reinforcing metal and the metal matrix and subjecting the assembly to pressure and elevated temperatures until the metal matrix becomes integrally bonded. Alternatively, in both instances the assembly can be rolled into a cylinder with the reinforcing fibers parallel to the axis of the cylinder and the resulting assembly extruded into a billet or compacted at elevated temperatures.

2 Claims, 4 Drawing Figures

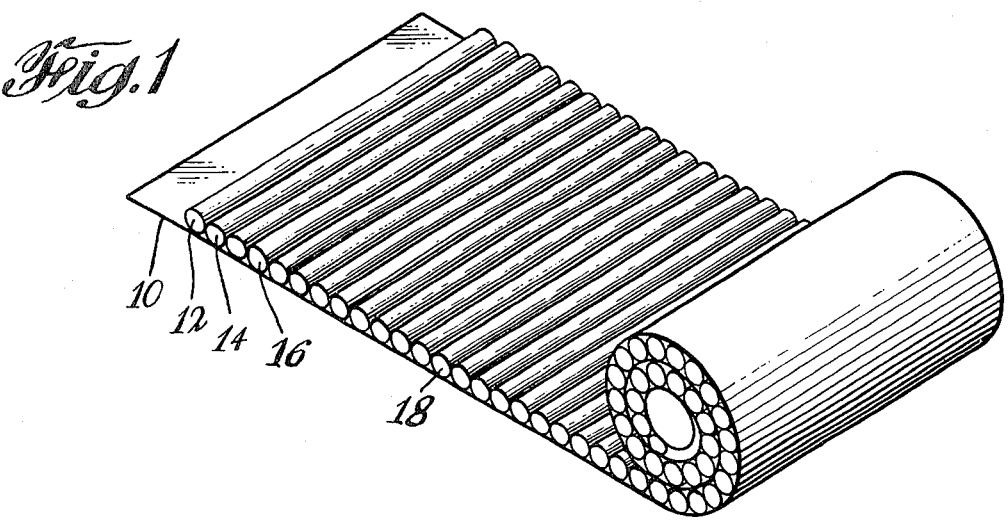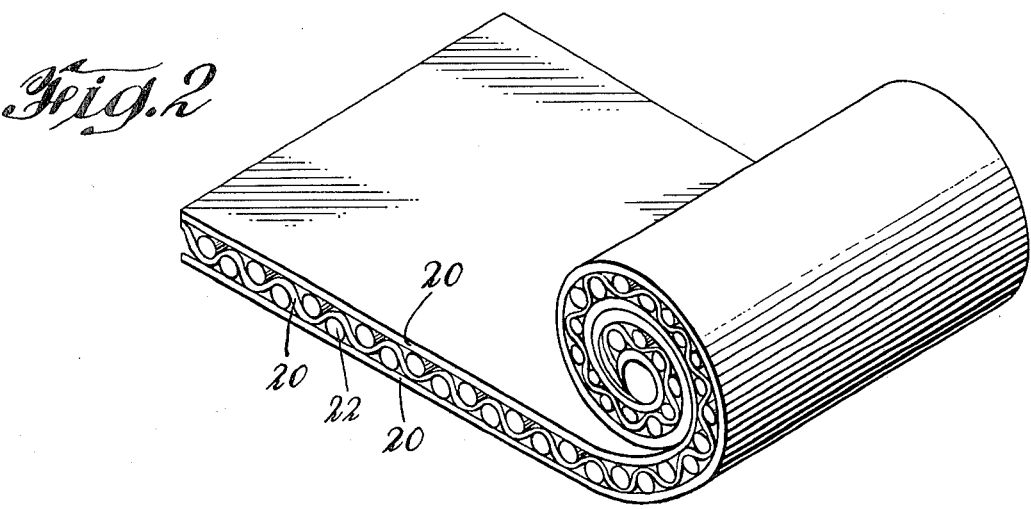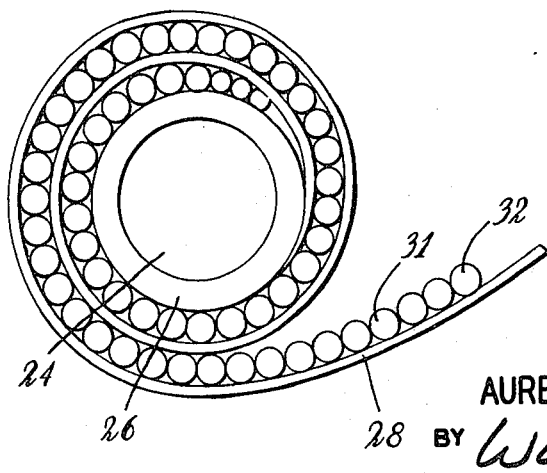

METHOD OF MAKING METALLIC COMPOSITE MATERIALS

This is a continuation of application Ser. No.831,170 filed June 6, 1969, now abandoned.

This invention relates in general to fiber reinforced composite materials and to processes for their preparation. In one aspect, this invention relates to a method for the precise alignment and uniform distribution of reinforcing fibers in a metal matrix. In a further aspect, this invention is directed to the preparation of sheets, rods, and the like of composite materials having greatly enhanced physical properties over that of the metal matrix alone.

In recent years several methods have been reported in the literature for the reinforcement of ordinarily low strength matrix materials with high strength reinforcing elements. For example, U.S. Pat. No. 3,371,407 which issued Mar. 5,1968 to P.J.E. Forsyth et al. discloses a method for producing composite metallic billets in which high strength reinforcing elements are embedded within a low strength matrix material in a desired pattern. This is achieved by the use of a mesh reinforcing layer having high strength elements extending in one direction and held parallel and evenly spaced by relatively low strength elements. The mesh is placed on one layer or between several layers of matrix material and rolled into a cylindrical assembly wherein the high strength reinforcing elements are parallel to the axis of the cylinder. The resulting cylinder is then subjected to hot compacting treatment to obtain a billet of the reinforced composite material.

More recently, U.S. Pat. No. 3,419,952 which issued to R.G. Carlson on Jan. 7, 1969, discloses a method for making certain aluminum and titanium metallic composites reinforced with oriented boron or beryllium metallic fibers. This is accomplished by producing parallel grooves on a sheet of matrix metal by a photochemical etching process normally used in the microelectronics art. The grooves are indicated to have a cross sectional diameter of about 0.005 inch and are subsequently filled with filaments of the order of 0.003 – 0.004 inch in cross-sectional diameter. Thereafter, other similarly prepared sheets were stacked one on top of another and the whole assembly subjected to pressure at elevated temperatures to obtain a coherently bonded composite.

Although the aforementioned typical prior art methods provide satisfactory reinforced composite materials, they are not without their inherent disadvantages. In the first described method, it is necessary to initially prepare a mesh of the reinforcing fibers of filaments wherein they are evenly spaced and held in position by relatively low strength elements. In as much as the low strength elements of the mesh must be flexible enough to undergo rolling with the matrix into the cylindrical form, they undoubtedly impart no improved properties to the resulting composite. Moreover, mechanical handling of a mesh which is relatively weak in one direction may result in rupture of the mesh and loss of the desired spacing of the reinforcing fibers. In the second patent for the fabrication of composite materials, the process requires a careful photochemical etching of the matrix sheet to provide the necessary grooves for the reinforcing fibers. This is a rather time consuming and expensive process in order to obtain evenly spaced grooves.

It is therefore an object of this invention to provide reinforced composite materials by methods which are simpler and easier than those heretofore reported in the literature. It is another object of this invention to provide reinforced composite materials wherein the reinforcing members are precisely aligned and uniformly distributed in a metal matrix. A further object of this invention is to provide composite materials in the form of sheets, rods, and the like.

Another object of this invention is to provide reinforced composite materials wherein no special retaining means are employed during fabrication to maintain the reinforcing members in their proper position. These and other objects will readily become apparent to those skilled in the art in the light of the teachings herein set forth.

In its broad aspect, this invention is directed to processes for the preparation of reinforced composite materials wherein the reinforcing members are precisely aligned and uniformly distributed in a metal matrix. In one embodiment of the invention assemblies are prepared which may be converted into integrally bonded reinforced composite materials by known metal working processes such as hot compacting, extrusion, drawing, rolling and the like, either at room temperature or elevated temperatures. The process of the first embodiment comprises the steps of :

a. depositing on a sheet of a metal matrix, to form an assembly, a single layer of a plurality of matrix members and reinforcing members, said reinforcing members being distributed evenly throughout said layer, and all of said members being aligned parallel to each other and held apart solely by the volume of adjacent members, b. subjecting said assembly to a metal working process wherein the metal matrix and matrix members are integrally bonded.

Alternatively, the assembly can be rolled into substantially cylindrical form with the reinforcing and matrix members parallel to the axis of said cylinder and then subjecting the cylinder to a metal working process such as extrusion and the like.

In a second embodiment, this invention is directed to the preparation of reinforced composite materials in the form of sheets or other configurations wherein the reinforcing members are also precisely aligned and uniformly distributed in a metal matrix. In this embodiment of the invention reinforced composite materials are prepared by a process which comprises the steps of:

a. forming a metal matrix configuration of uniform thickness and comprised of a plurality of uniform, adjacent, parallel and alternating ridges and channels, b. placing reinforcing members which have a length to diameter ratio of greater than 20 and which have a higher strength than said metal matrix, in and parallel to, at least some of the sites formed by said ridges and channels, c. covering at least one surface of said configuration with a sheet of metal to form an assembly, d. subjecting a composite comprised of at least one assembly to pressure and elevated temperatures until all of said sheets of metal and configurations are intergrally bonded to each other, with the proviso that if the composite is comprised of but one assembly, all of said reinforcing members are covered by at least one sheet of metal.

Alternatively, the assembly can be fabricated into a cylinder as in the first embodiment and subjected to metal working to obtain an integrally bonded reinforced composite.

With reference to the drawings, FIGS. 1, 2 and 3 depict three types of composites at various stages of preparation.

FIG. 4 is a plot showing differences in tensile strength versus percent elongation at 1800°F. of a metal before and after reinforcement.

The following detailed description and reference to the accompanying drawings will aid in an understanding of the invention. With detailed reference to the accompanying drawings, FIG. 1 shows one view of an assembly in preparation in accordance with the first embodiment of this invention. Metal matrix 10 has contained on its surface and uniformly aligned, matrix and reinforcing members 12, 14, 16 and 18. The reinforcing members may alternate with the matrix members such that every other member shown in FIG. 1 is a reinforcing member, i.e. 12, 16, etc., or the reinforcing members may occur periodically such as at 14 and 18. Upon rolling the metal matrix into the form of a cylinder, a spiral pattern of the matrix sheet 10 is formed which maintains within it a second spiral of the matrix and reinforcing members.

FIG. 3 depicts a side view of the assembly of the first embodiment. Metal matrix 28 which is essentially rolled into cylindrical form, has contained therein uniformly aligned matrix and reinforcing members. Members 31 and 32 are reinforcing members and illustrate that the reinforcing rods are interspaced with two matrix members throughout the entire assembly. The core of the assembly can be entirely of one material. For example, in FIG. 3 both 24 and 26 can be of matrix material, reinforcing material, or the like. Alternatively, the core 24 can be composed of one material surrounded by a cylinder of another metal.

FIG. 2 shows one view of an assembly in preparation in accordance with the second embodiment of this invention. On bottom sheet 20 which is composed of the matrix metal is disposed a corrugated sheet 20 also of the matrix metal. Filling the openings formed by bottom sheet 20 and the valleys of the corrugated sheet 20, are reinforcing members 22. Top sheet 20 is also of the matrix metal. The partially rolled end of the assembly shows the spiral nature of the matrix sheets and the reinforcing members. It is, of course, not necessary to fill every opening in the corrugated matrix with reinforcing members. If desired the members may be uniformly distributed with, for example, a reinforcing member in every tenth opening.

In some instances wherein a relatively high volume of reinforcing members is desired step (b) above, may include filling all the channels on one side of the matrix, covering them with a sheet of metal, turning the matrix over, and then filling the channels on the opposite side.

As indicated, the metal matrix configuration is of uniform thickness and is comprised of a plurality of uniform, adjacent, parallel and alternative ridges and channels. For example, the matrix configuration can be corrugated, saw tooth, square tooth and the like. Moreover, the composite may be comprised of a single layer, i.e. one corrugated matrix with top and bottom covering sheets or a multilayered assembly wherein the reinforcing members in one layer may be parallel to those of another, or at an angle to one another.

FIG. 4 is a graph showing the change in tensile strength at 1800°F. versus percent elongation of a reinforced composite material as opposed to the unreinforced matrix material. Curve B was obtained on a stainless steel matrix which had no reinforcing members. Curve A was obtained on a composite of the same stainless steel which contained 50 volume percent of tungsten fibers and was prepared by extruding a spiral assembly fabricated as depicted in FIG. 1.

It has been observed that reinforced composite materials prepared in accordance with the teachings of this invention possess enhanced physical and chemical properties over the non-reinforced material. It has also been observed that this invention is applicable to a wide variety of materials as hereinafter indicated. Not only can composites be formed wherein the metal matrix is merely reinforced to increase it strength, but composites can be formed wherein the matrix itself serves to shield reinforcing members which might otherwise be adversely affected by the conditions to which they are subjected. Thus, while it is possible to prepare reinforced composites of aluminum containing stainless steel wire reinforcing members wherein the resulting composite has greatly increased strength over the non-reinforced aluminum, it is also possible to prepare composites wherein a relatively weak matrix is employed primarily to protect reinforcing fibers of substantially higher strength. For instance, stainless steel is relatively weak at high temperatures, i.e. about 1.000°C., whereas tungsten is relatively strong. However, at high temperatures tungsten readily oxidizes in air and hence must be protected. Thus, one can take advantage of the desirable high temperature properties of tungsten by protecting its undesirable properties with a stainless steel matrix.

Hence, the process of the present invention is particularly unique in that it is relatively easy to prepare composites wherein the volume percent of reinforcing member is relatively high. In contrast to grooved matrices wherein the depth and proximity of the grooves are limited in order to have a structurally coherent matrix, the corrugated sheet employed in this invention permits reinforcing members to be disposed in each channel and on both sides. Hence, if thin corrugated and covering sheets are employed, a relatively high volume percent of the reinforcing member can be obtained. This is of particular importance if the metal matrix is merely desired to protect the reinforcing member from corrosion, oxidation and the like, as would be the case with materials like tungsten.

It has been found that the present invention is applicable to the preparation of a wide variety of composite materials. Illustrative materials which have been prepared include, among others, aluminum or aluminum alloys reinforced with members of stainless steel, aluminum precoated carbon steel, titanium-aluminum alloys, titanium-aluminum-tin alloys, cobalt-beryl-lium alloys, iron-cobalt-nickel-chromium alloys, nickeld-cobalt-chromium alloys, boron, silicon carbide, glassfibers, and the like; copper or copper alloys all reinforced with stainless steel or like reinforcing members or copper reinforced with a super conducting material, i.e., niobium-titanium, niobium-zirconium, niobium-tin alloys or compounds; chromium reinforced with refractory metals, e.g. tungsten; nickel-chromium alloys (20–60 weight percent chromium) reinforced with refractory metals, e.g. tungsten; nickel-chromium-molybdenum (20–40 weight percent chromium) alloys reinforced with tungsten or other refractory metals; nickel-chromium (up to 60 weight percent chromium)-rhenium (up to 10 weight percent rhenium) alloys reinforced with tungsten or other refractory metals; nickel-chromium (up to 60 weight percent) silicon (0.5 weight percent) manganese (0.5 weight percent) rare earth metals (0.2 weight percent) alloys reinforced with refractory metals; nickel-chromium (up to 60 weight percent) rhenium (up to 10 weight percent) silicon (0.5 weight percent) manganese (0.5 weight percent) rare earth metals (0.2 weight percent) alloys reinforced with refractory metals such as tungsten, and the like. Composite materials can also be prepared from nickel-aluminum (3-10 weight percent), nickel-aluminum-chromium alloys, nickel-aluminum-molybderum alloys; or nickel-aluminum (3-10 weight percent) rhenium (up to 10 weight percent) silicon (0.5 weight percent) manganese (0.5 weight percent) rare earths (0.2 weight percent) alloys reinforced with refractory or other metals; iron-aluminum (3-40 weight percent aluminum) or iron-aluminum (3-40 weight percent) rhenium (up to 10 weight percent) silicon (0.5 weight percent) manganese (0.5 weight percent) rare earths (0.2 weight percent) alloys reinforced with refractory or other metals.

Additionally, composites can be prepared from precious metals such as gold, silver, platinum, rhodium and the like, reinforced with strong fibers of common metals or different precious metals or alloys thereof.

It is therefore evident that the present invention is applicable to a wide variety of aluminum, chromium and nickel-based alloys as well as others not specifically mentioned.

The particular pressures and temperatures employed to integrally bond the assembly will, of course, be dependant upon the choice of matrix and reinforcing materials, volume percent of reinforcing material, as well as the metal working process itself. The temperature and pressures should be of sufficient magnitude to integrally bond the matrix material and reinforcing members. Temperatures up to about 1250°C. and higher, may be necessary to achieve good bonding. For example, for a 50 volume percent tungsten in stainless steel, temperatures of from about 900° – 1250°C. can be employed.

In practice, the reinforcing members should have a length to diameter ratio of at least about 20 to 1, to permit the matrix material to be integrally bonded and at the same time provide the desired reinforcement.

In another embodiment of this invention, the assembly can be subjected to pressures and temperatures just sufficient to integrally bond the matrix material and yet not of such magnitude to provide a completely closed structure. For example, if not all of the sites of the corrugated sheet are filled, the resulting product can contain channels or openings running the length of the article. The resulting article contains periodic channels through which a fluid can be passed for heat extraction or cooling purposes. Additionally, the open channels reduce the overall weight of the product and yet a reinforced product is obtained.

In general, fabrication of the assemblies of this invention are easily adaptable to mass production. The corrugated or other type sheets can easily be filled mechanically with the reinforcing members, stacked in multilayers if desired and passed on to the working step. Due to the corrugated structure, once the reinforcing member is dropped into the appropriate channel precise alignment is insured in the finished composite.

It will be obvious that the reinforced compositions of this invention are useful in a wide variety of applications. For example, reinforced aluminum sheets and rods are particularly useful where a lightweight material is desired, e.g., aircraft components, and the like. The reinforced nickel-chromium alloys are particularly useful for fabricating materials which are exposed to relatively high temperatures, for example, in turbine blades and the like. When composite of precious metals, such as for example gold, platinum, rhodium and the like are prepared containing fibers of common metals or other precious metals, aesthetically pleasing designs and patterns are formed which render the composites particularly useful as jewelry or other ornamentations.

The following examples are illustrative:

EXAMPLE 1

A corrugated sheet of aluminum, approximately 100 millimeters wide 500 millimeters long and 0.1 millimeter thick, and two other plain aluminum sheets of the same length and width but 1.0 millimeter thick were cleaned by chemical etching. Thereafter each valley of the corrugated sheet was filled with a stainless steel wire having a diameter of approximately 0.5 millimeter. The corrugation can be such that the stainless steel wires are at the desired distance (e.g. 0.5 and 1 millimeter in this example). Thereafter the corrugated aluminum sheet was sandwiched between the two plane sheets and the resulting assembly placed in an air furnace. After heating for 5-10 minutes, the assembly was passed through a rolling mill while at 500° – 550°C. This procedure was repeated twice. The pressure exerted during the rolling step was of such magnitude that the reduction in cross section was sufficient to completely fill the spaces between the matrix and wires.

Examination of the finished product showed no decohesion between the reinforcing wires and matrix. Evaluation of the reinforced material showed that it contained 16 percent volume fraction of stainless steel and exhibited a strength of 26 kilograms/millimeter$^2$. In contrast, the pure aluminum matrix showed a strength of 8 kilograms/millimeter$^2$. When the increase in density of the composite is taken into account, the specific degree of reinforcement is 2.4 at room temperature.

EXAMPLE 2

In a manner similar to that employed in Example 1, a corrugated sheet of nickel-chromium alloy matrix (40 weight percent chromium) was placed on a plane sheet of the same material and the valleys filled with tungsten fibers. The matrix was turned over and the remaining valleys filled and a second sheet placed on top. After heating and rolling a reinforced composite was obtained which had a 16 percent volume of tungsten. This composite showed a greater stability at 2100°F. for an extended period of time than a similarly prepared composite of stainless steel reinforced with tungsten.

EXAMPLE 3

An assembly of tungsten reinforced stainless steel was prepared by first cutting tungsten wires (1 millimeter diameter) to the same length as the width of a sheet of stainless steel. The stainless sheet measured approximately 100 millimeters wide, 1000 millimeters long and 0.1 millimeter in thickness. Tungsten wires and stainless steel wires were then arranged in an alternative pattern on the stainless steel matrix sheet so that they were all parallel and held apart from each other solely by the volume of each fiber. The sheet was then wound on lathe around a core of the matrix material. The resulting assembly had a spiral pattern of the sheet of matrix material which maintained within it a second spiral of reinforcing tungsten wires. The assembly was then heated to 1200°C. and extruded on a 600 ton extrusion press. The billet obtained had 50 percent volume of tungsten. Thereafter the extruded bars were cut into 9 centimeter length and a tensile specimen machined. Evaluation of the specimen showed that at 1800°F. it had a tensile strength of 21 kilograms/millimeters$^2$ as opposed to 3.16 kilograms/millimeters$^2$ for the stainless steel matrix alone.

Although the invention has been illustrated by the preceding examples, it is not to be construed as being limited to the materials employed therein, but rather the invention relates to the generic area as hereinbefore disclosed. Various modifications and embodiments of this invention can be made without departing from the spirit and scope thereof.

What is claimed is:

1. A process for the preparation of a composite material which comprises the steps of:
   a. depositing on a sheet of a metal matrix to form as assembly, a single layer of a plurality of matrix members and reinforcing members, said reinforcing members being distributed evenly and throughout said layer, and all of said members being aligned parallel to each other and held apart solely by the volume of adjacent members.
   b. subjecting said assembly to a metal working process wherein the metal matrix and matrix members are integrally bonded.

2. The process of claim 1 wherein said assembly is formed into a cylinder with the reinforcing and matrix members parallel to the axis of said cylinder and the cylinder subsequently extruded.

* * * * *